Patented Nov. 15, 1949

2,488,082

UNITED STATES PATENT OFFICE 2,488,082

MANUFACTURE OF ACETYLENIC ALCOHOLS

Eugen Gottfried Galitzenstein, London, and Cyril Woolf, Finchley, London, England, assignors to The Distillers Company, Limited, Edinburgh, Scotland, a British company No Drawing. Application October 26, 1945, Serial No. 624,934. In Great Britain October 23, 1944

Section 1, Public Law 690, August 8, 1946
Patent expires October 23, 1964

5 Claims. (Cl. 260—638)

This invention is for improvements in or relating to the manufacture of acetylenic alcohols.

It is known that acetylenic alcohols can be prepared by reacting acetylene with ketones in the presence of condensing agents comprising alkali metal alcoholates such as sodium ethylate (German Patent No. 291,185), potassium tert-amylate or potassium tert-butylate (Journal of the American Chemical Society, 1935, vol. 57, page 340: 1941, vol. 63, page 186), and the alkali metal salts of monoalkyl ethers of mono or polyalkylene glycols (Patent No. 2,161,191), most of these alkali metal alcoholates being derived from alcohols which are completely soluble in water in all proportions.

According to the present invention a process for the manufacture of acetylenic alcohols comprises reacting acetylene with a ketone in the presence of an alkali metal alcoholate of a primary or secondary, saturated, alcohol, containing only one oxygen atom in the molecule, and which is not soluble in water in all proportions. Preferably the said alcohol is one whose water-solubility is less than 15% by weight at room temperature, and such alcohols are hereinafter referred to as "sparingly water-soluble alcohols"; examples of such alcohols are sec-butyl alcohol, B. Pt. 99.5° C., water-solubility 12.5% by weight, isoamyl alcohol, B. Pt. 130° C., water-solubility 2.85% by weight, cyclo-hexanol, B. Pt. 161° C., water-solubility 6.0% by weight and n-butyl alcohol, B. Pt. 117.7° C., water-solubility 7.7% by weight.

The use of the alkali metal alcoholates of these sparingly water-soluble alcohols as condensing agents is advantageous because they can be easily prepared by direct reaction between the alkali metal hydroxide and the selected alcohol, as is described for example in British Patent No. 304,585, and because, after the reaction, both the alkali metal hydroxide and the sparingly water-soluble alcohol are readily recoverable for reuse. Furthermore, we have found that the use of a sparingly water-soluble alcohol is particularly advantageous as it enables the almost quantitative recovery, by extraction, of the acetylenic alcohols from their solutions in aqueous alkali metal hydroxides. As an example of the efficiency of this class of solvents 3-methyl-but-1-yn-3-ol distributes itself between equal volumes of commercial amyl alcohol and 25% by weight aqueous potassium hydroxide solution in the ratio of 4.2:1.

Both the sodium and the potassium alcoholates of the sparingly water-soluble alcohols may be used as condensing agents, but we prefer to employ the potassium alcoholates which are very powerful condensing agents, bringing about the reaction between acetylene and the ketones in a short time with excellent conversion of the ketone to the corresponding acetylenic alcohol. A very suitable alcohol for technical employment, in many cases, is the commercial amyl alcohol obtained by a fermentation process and consisting mainly of a mixture (B. Pt. 129–131° C.) of 2-methyl-butan-1-ol and 3-methyl-butan-1-ol. The choice of the particular alcohol for use in the preparation of the condensing agent is governed by the difference in boiling points between the acetylenic alcohol it is proposed to manufacture and the alcohol of the alkali metal alcoholate, so that mixtures of the two can be easily separated by fractional distillation. For example, commercial amyl alcohol (B. Pt. 129–131° C.) is suitable for use in the preparation of dimethyl-ethynyl carbinol (B. Pt. 104° C.), and cyclohexanol (B. Pt. 161° C.) is suitable for the preparation of methyl-ethyl-ethynyl carbinol (B. Pt. 120° C.). Thus our invention makes possible a wide choice of condensing agents for the preparation of a large number of acetylenic alcohols which may be readily isolated after reaction.

It is necessary to free the condensing agents from any excess of alcohol as we find that the presence of such alcohol lowers the reactivity of the condensing agents. The removal of excess alcohol from the alkali metal alcoholates is carried out by heating (preferably in vacuo) in the presence of an inert organic liquid which has a boiling point, at atmospheric pressure, at least 50° C. higher than that of the alcohol used in the preparation of the alkali metal alcoholate. The high boiling inert liquids which can be employed may either be non-solvents for the alkali metal alcoholate, such as cumene, n-butyl formal, diethylaniline or di-isopropyl-benzene or else they may be solvents for the alkali metal alcoholate such as the dialkyl ethers of ethylene and polyalkylene glycols.

The process of this invention, using a potassium alcoholate, can be carried out cyclically somewhat as follows:

(1) An aqueous solution of potassium hydroxide is converted to the potassium alcoholate by heating it with a mixture containing an excess of the sparingly water-soluble alcohol and a high-boiling inert organic liquid. The water, including the water produced by the reaction, is removed as an azeotrope with part of the excess of sparingly water-soluble alcohol, and the potassium alcoholate, in admixture with the rest of the excess alcohol and the high-boiling inert organic liquid, is obtained. The excess of alcohol in this mixture is then removed by distillation either at normal pressure, or preferably at a reduced pressure.

(2) Acetylene is passed into the solution or suspension of the potassium alcoholate in the high-boiling inert liquid obtained as in (1), a temperature of between −15° C. and + 10° C. being maintained, whereby potassium acetylide is produced.

The ketone is then added to the reaction mixture whilst continuing the passage of acetylene and the potassium alcoholate of the corresponding acetylenic alcohol is produced.

It will be appreciated that as the acetylide results from a reversible reaction, between the alkali metal alcoholate and acetylene, its production is hindered by the presence of an excess of the selected sparingly water-soluble alcohol whereas in the condensation reaction, an excess of acetylene is an advantage.

(3) The free acetylenic alcohol is liberated by the addition of water to the product resulting from the operation described in (2) and two phases are thereby formed, from which the acetylenic alcohol is isolated. The potassium hydroxide is recovered as an aqueous solution and is used to prepare a further batch of potassium alcoholate utilizing the regenerated sparingly water-soluble alcohol and high-boiling inert organic liquid recovered during the isolation of the acetylenic alcohol, and so the cycle of operations can be carried out afresh.

The following examples illustrate the manner in which the invention may be carried into effect, percentage figures being calculated by weight unless otherwise stated.

*Example 1*

During a period of four hours, 2.57 kilos of a 42.5% aqueous potassium hydroxide solution were fed into the top of a mild steel fractionating column connected to a kettle containing a mixture of 8 litres of commercial amyl alcohol and 9 litres of the ethyl-butyl ether of diethylene glycol refluxing under a pressure of 60 mm. of mercury. During its passage down the column the potassium hydroxide was converted to potassium amylate by reaction with the amyl alcohol, water being removed from the top of the column as an azeotrope with amyl alcohol. When no more water was given off, the kettle contents were cooled, and all excess amyl alcohol was distilled off under a pressure of 30 mm. of mercury, the kettle temperature rising to about 140° C.

Ten litres of the resulting solution of potassium amylate in the ethyl-butyl ether of diethylene glycol, containing 15.7 mols of potassium amylate, were transferred to a mild steel agitator pot and were maintained at 0° C. throughout the subsequent operations. Acetylene was introduced into the solution over a period of 1¾ hours, 180 litres of gas dissolving before the rate of absorption began to decline. During the next 3½ hours, 858 gms. of acetone were added whilst continuing the passage of acetylene until absorption ceased, a further 302 litres of acetylene passing into solution.

At the completion of the reaction, 1.76 litres of water were slowly added to the reaction product, 34 litres of acetylene being thereby disengaged and recovered. After hydrolysis of the potassium alcoholate of the acetylenic alcohol had occurred, separation into layers occurred, and the oil layer after separation from the layer of aqueous potassium hydroxide was consecutively washed with two amounts of water each of 350 c. c. to recover residual potassium hydroxide. The aqueous solutions were combined and shaken five times with 500 c. c. portions of amyl alcohol to extract the acetylenic alcohol contained in the aqueous potassium hydroxide solution. The several amyl alcohol extracts and the main oil layer were mixed and neutralised with dilute sulphuric acid. The amyl alcohol-acetylenic alcohol mixture contained 2% of the potassium hydroxide originally present as potassium amylate and this was destroyed, the remaining 98% of the potassium hydroxide being recovered in the form of the combined aqueous solutions.

The neutralised oil-amyl alcohol mixture with 10% by volume of benzene added thereto was gently heated whereby 92 litres of dissolved acetylene were disengaged and recovered, and water was then removed by distilling off as an azeotrope with benzene. After benzene had been distilled away, the acetylenic alcohol, 3-methyl-but-1-yn-3-ol, was collected between 102°–105° C. Intermediate fractions containing mixtures of the acetylenic alcohol with benzene or amyl alcohol were further fractionated and an overall yield of 1144 g. of 3-methyl-but-1-yn-3-ol were obtained constituting a 92% yield based on the acetone used. The residue of amyl alcohol and ethyl-butyl ether of diethylene glycol remaining in the still kettle after distilling off the acetylenic alcohol was used, without further treatment, together with the recovered solution of potassium hydroxide, to prepare a fresh batch of potassium amylate reagent as described above and the cycle of operations continued. In all, six batches were performed successfully, the constituents of the condensing agent being recovered each time. The last batch showed no signs of diminished activity of the condensing agent.

*Example 2*

A suspension of potassium amylate in diethylaniline was prepared in a manner analogous to that already described in Example 1. The condensing agent, containing 1.2 mols of potassium amylate in 750 c. c. of diethylaniline, was maintained at 0° C. and was saturated with acetylene. Acetone (54.3 g.) was then introduced as a vapour in admixture with acetylene during a period of two hours, in all 29 litres of acetylene dissolving. The product was hydrolysed with water and worked up as described in Example 1. A 94% yield of 3-methyl-but-1-yn-3-ol based on the acetone used was obtained.

In addition to acetone, methyl-ethyl ketone, methyl-propyl ketone, diethyl ketone, methyl-amyl ketone, di-isopropyl ketone and cyclohexanone, were reacted with acetylene to form the corresponding acetylenic alcohols by processes, which were substantially the same as those described in the foregoing examples, in which other sparingly water-soluble primary or secondary alcohols, such as n-butyl or sec-butyl alcohol, were used.

Details of operational procedure have been described in Examples 1 and 2 which relate to the preparation of 3-methyl-but-1-yn-3-ol, but it will be appreciated that variations of the described procedure are possible. For example, the alkali metal alcoholates may be prepared in a continuous manner by feeding aqueous alkali metal hydroxide and sparingly water-soluble alcohol to the top of a fractionating column removing water azeotropically, and continuously removing the solution of alkali metal alcoholate in excess alcohol from the bottom of the column. Again, the condensing agent may be freed from excess alcohol in a continuous manner by feeding the solution of alkali metal alcoholate in excess alcohol together with the high-boiling inert solvent to the top of a fractionating column, distilling off excess alcohol, and continuously removing the resultant solution of alkali metal alcoholate in high-boiling inert solvent from the bottom of the column. As an example of a further variation the solution of acetylenic alcohol in aqueous alkali metal hydroxide may be countercurrently extracted with a suitable solvent in a packed tower and in this way a more concentrated solution of acetylenic alcohol in the solvent is obtained.

What we claim is:

1. A process for the manufacture of acetylenic alcohols which comprises a cycle consisting of a first stage of acetylene feed to an anhydrous dispersion of an alkali metal alcoholate of a sparingly water-soluble alcohol of the class consisting of primary and secondary saturated alcohols containing only one oxygen atom in the molecule and having a water-solubility not in excess of 15% by weight at room temperature, in an inert organic diluent, whilst maintaining a temperature of $-15°$ C. to $+10°$ C., a second stage comprising the addition of a ketone to the reaction mixture resulting from said first stage and an acetylene feed to said ketone-containing reaction mixture whilst maintaining a temperature of $-15°$ C. to $+10°$ C., a third stage of recovery of acetylenic alcohol and alkali metal hydroxide solution from the reaction mixture by addition of water and extraction with said sparingly water-soluble alcohol, and a fourth stage of regeneration of alkali metal alcoholate by reaction of the aqueous alkali metal hydroxide solution recovered from the third stage with the sparingly water-soluble alcohol recovered from said third stage, said regenerated alkali metal alcoholate being re-cycled after dehydration for re-use in the first stage of the process.

2. A process for the manufacture of acetylenic alcohols which comprises a cycle consisting of a first stage of acetylene feed to an anhydrous dispersion of an alkali metal alcoholate, of a sparingly water-soluble monohydric saturated alcohol containing from four to six carbon atoms in the molecule and having at least one hydrogen atom attached to the carbon atom bearing the hydroxyl group, in an inert organic diluent, whilst maintaining a temperature of $-15°$ C. to $+10°$ C., a second stage comprising the addition of a ketone to the reaction mixture resulting from said first stage and an acetylene feed to said ketone-containing reaction mixture whilst maintaining a temperature of $-15°$ C. to $+10°$ C., a third stage of recovery of acetylenic alcohol and alkali metal hydroxide solution from the reaction mixture by addition of water and extraction with said sparingly water-soluble alcohol, and a fourth stage of regeneration of alkali metal alcoholate by reaction of the aqueous alkali metal hydroxide solution recovered from the third stage with the sparingly water-soluble alcohol recovered from said third stage, said regenerated alkali metal alcoholate being re-cycled after dehydration for re-use in the first stage of the process.

3. A process for the manufacture of acetylenic alcohols which comprises a cycle consisting of a first stage of acetylene feed to an anhydrous dispersion of a potassium alcoholate of a sparingly water-soluble monohydric saturated alcohol containing from four to six carbon atoms in the molecule and having at least one hydrogen atom attached to the carbon atom bearing the hydroxyl group, in an inert organic diluent, whilst maintaining a temperature of $-15°$ C. to $+10°$ C., a second stage comprising the addition of a ketone to the reaction mixture resulting from said first stage and an acetylene feed to said ketone-containing reaction mixture whilst maintaining a temperature of $-15°$ C. to $+10°$ C., a third stage of recovery of acetylenic alcohol and potassium hydroxide solution from the reaction mixture by addition of water and extraction with said sparingly water-soluble alcohol, and a fourth stage of regeneration of potassium alcoholate by reaction of the aqueous potassium hydroxide solution with the sparingly water-soluble alcohol recovered from the third stage, said regenerated potassium alcoholate being re-cycled after dehydration for re-use in the first stage of the process.

4. A process for the manufacture of acetylenic alcohols which comprises reacting an aqueous solution of an alkali metal hydroxide with a sparingly water-soluble alcohol of the class consisting of primary and secondary saturated alcohols containing only one oxygen atom in the molecule and having a water-solubility not in excess of 15% by weight at room temperature in the presence of an inert organic liquid diluent having a boiling point not less than 50° C. higher, at atmospheric pressure than said sparingly water-soluble alcohol to form the alkali metal alcoholate of said sparingly water-soluble alcohol, distilling water and free sparingly water-soluble alcohol from the reaction mixture, passing acetylene into the water-free alcohol-free reaction mixture whilst maintaining it at a temperature between $-15°$ C. and $+10°$ C. to form the alkali metal acetylide, adding a ketone to the reaction mixture thus obtained and passing acetylene into the ketone-containing reaction mixture whilst maintaining it at a temperature between $-15°$ C. and $+10°$ C. to form the alkali metal alcoholate of the acetylenic alcohol, decomposing said alcoholate by the addition of water to produce the acetylenic alcohol and alkali metal hydroxide and recovering the acetylenic alcohol from the aqueous alkali metal hydroxide solution and treating the aqueous alkali metal hydroxide solution with a quantity of said sparingly water-soluble alcohol to form the alcoholate thereof and to complete the cycle of operations and repeating the said cycle of operations.

5. A process for the manufacture of acetylenic alcohols which comprises reacting an aqueous solution of potassium hydroxide with a sparingly water-soluble alcohol of the class consisting of primary and secondary saturated alcohols containing only one oxygen atom in the molecule and having a water-solubility not in excess of 15% by weight at room temperature in the presence of an inert organic liquid diluent having a boiling point not less than 50° C. higher, at atmospheric pressure than said sparingly water-soluble alcohol to form the potassium alcoholate of said sparingly water-soluble alcohol, distilling water and free sparingly water-soluble alcohol from the reaction mixture, passing acetylene into the water-free alcohol-free reaction mixture whilst maintaining it at a temperature between $-15°$ C. and $+10°$ C. to form the potassium acetylide, adding a ketone to the reaction mixture thus obtained and passing acetylene into the ketone-containing reaction mixture whilst maintaining it at a temperature between $-15°$ C. and $+10°$ C. to form the potassium alcoholate of the acetylenic alcohol, decomposing said alcoholate by the addition of water to produce the acetylenic alcohol and potassium hydroxide and recovering the acetylenic alcohol from the aqueous potassium hydroxide solution and treating the aqueous potassium hydroxide solution with a quantity of said sparingly water-soluble alcohol to form the alcoholate thereof and to complete the cycle of operations and repeating the said cycle of operations.

EUGEN GOTTFRIED GALITZENSTEIN.
CYRIL WOOLF.

REFERENCES CITED

The following references are of record in the file of this patent:

UNITED STATES PATENTS

| Number | Name | Date |
|---|---|---|
| 2,385,547 | Smith | Sept. 25, 1945 |
| 2,385,548 | Smith | Sept. 25, 1945 |

OTHER REFERENCES

Gould, J. Am. Chem. Soc., vol. 57, pages 340–345 (1935).

Thompson, J. Am. Chem. Soc., vol. 63, pages 186–188 (1941).